United States Patent [19]

Holland

[11] Patent Number: 5,749,118
[45] Date of Patent: May 12, 1998

[54] HEATED WIPER BLADE

[76] Inventor: Dewey T. Holland, 2275 Hamptons Crossing, Alpharetta, Ga. 30005

[21] Appl. No.: 14,320

[22] Filed: Feb. 5, 1993

[51] Int. Cl.⁶ .................................. B60S 1/04; B60S 1/38
[52] U.S. Cl. .................... 15/250.07; 15/250.06; 219/202; 219/505
[58] Field of Search ................ 15/250.05, 250.06, 15/250.07, 250.08, 250.09, 250.36, 250.42, 250.41; 219/202, 203, 505, 504, 548, 549, 553

[56] References Cited

U.S. PATENT DOCUMENTS

| | | |
|---|---|---|
| 3,339,044 | 8/1967 | Ruckriegel et al. |
| 3,489,884 | 1/1970 | Waseleski, Jr. |
| 3,530,525 | 9/1970 | Abel ........................ 15/250.07 |
| 3,747,500 | 7/1973 | Redd . |
| 3,943,316 | 3/1976 | Oster . |
| 3,946,346 | 3/1976 | Oster et al. |
| 4,071,836 | 1/1978 | Cook et al. |
| 4,334,148 | 6/1982 | Kampe ........................ 219/548 |
| 4,387,290 | 6/1983 | Yasuda . |
| 4,410,790 | 10/1983 | Berg et al. |
| 4,442,566 | 4/1984 | Sharp ........................ 15/250.42 |
| 4,469,044 | 9/1984 | Bloom et al. |
| 4,497,083 | 2/1985 | Nielsen, Jr. et al. ........ 15/250.06 |
| 4,528,715 | 7/1985 | Zrimsek ........................ 15/250.42 |
| 4,529,868 | 7/1985 | Bowen et al. |
| 4,543,474 | 9/1985 | Horsma et al. ........................ 219/548 |
| 4,603,451 | 8/1986 | VanSickle . |
| 4,629,869 | 12/1986 | Bronnvall ........................ 219/549 |
| 4,967,437 | 11/1990 | Morse ........................ 15/250.07 |
| 5,050,569 | 9/1991 | Beunk et al. |
| 5,065,471 | 11/1991 | Laplante . |
| 5,221,828 | 6/1993 | Basheer et al. ........................ 15/250.06 |

FOREIGN PATENT DOCUMENTS

| | | | |
|---|---|---|---|
| 63-197777 | 3/1988 | Japan ........................ | 15/250.07 |

OTHER PUBLICATIONS

"Self-Limiting Heaters for Automotive and Truck Exterior Mirrors" by Thermacon, Inc.
"Polymeric PTC Devices for Protecting Electronic Circuits" by Thermacon, Inc.
Article from *The New York Times*, Saturday, Jun. 2, 1990 entitled "Windshield Wipers Heated to Prevent Ice".

Primary Examiner—Gary K. Graham
Attorney, Agent, or Firm—Roger Norman Coe

[57] ABSTRACT

The present invention is a heated wiper blade comprising an elongated blade and a heating element connected to the electrical system of a vehicle. The heating element utilizes a material with a positive temperature coefficient of resistance placed between a pair of conductive members. The conductive members span the length of the heating element to provide a uniform distribution of heat through the length of the blade. Electrical connections to the heating element are preferably located at one end of the blade. The heating element can be located inside the blade or between a semi-rigid attachment member and an upper surface of the blade.

7 Claims, 1 Drawing Sheet

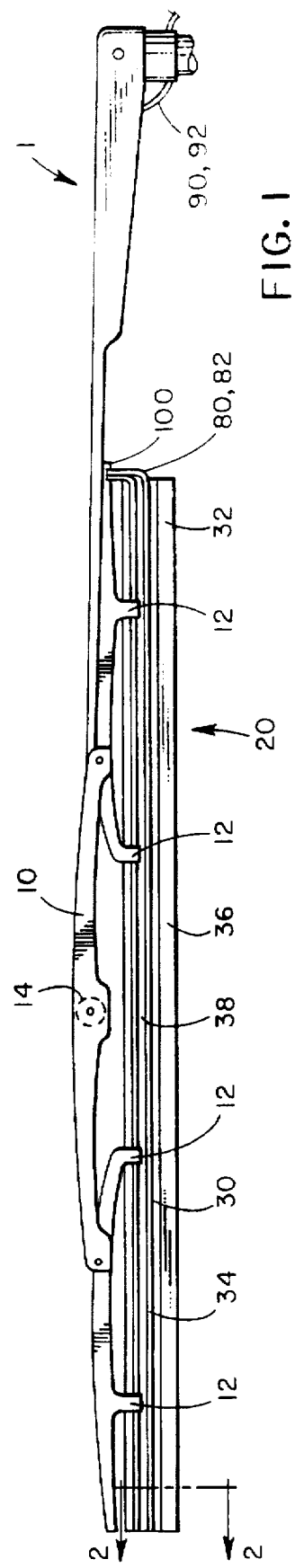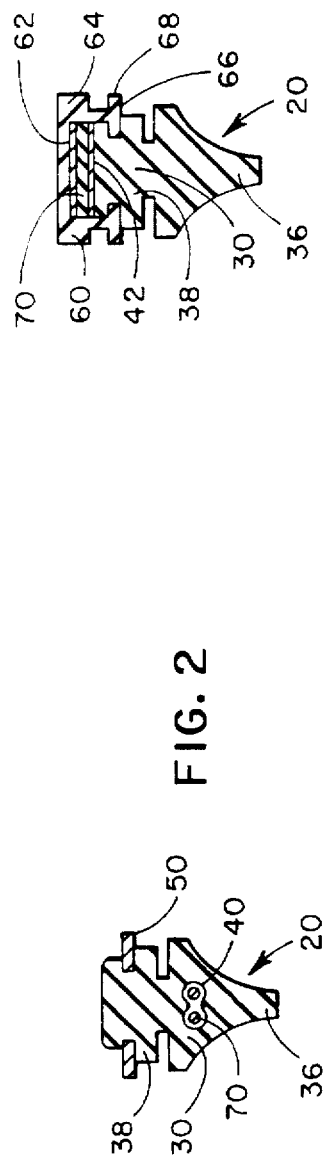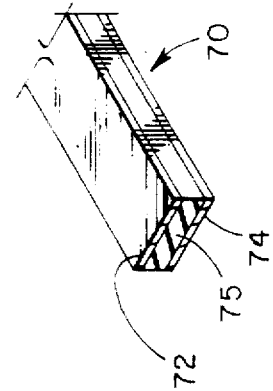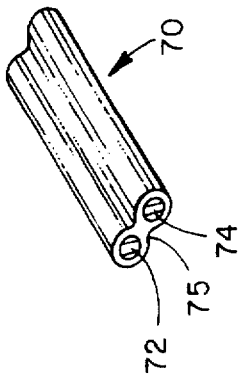

HEATED WIPER BLADE

DESCRIPTION

1. Technical Field

The present invention relates to a heated wiper blade utilizing a heating element with a positive temperature coefficient of resistance.

2. Background Prior Art

Windshield wipers have existed since the inception of the motor vehicle. Unfortunately, as most drivers are aware, these wiper blades suffer from a variety of problems. All too often, the blades leave streaks of water across the windshield. This streaking diminishes the driver's view and produces a safety risk to everyone in or around the vehicle.

The effectiveness of windshield wipers is especially poor when temperatures go below freezing and a layer of ice, snow or slush accumulates on the windshield and the wiper blades. This layer prevents the blades from engaging the surface of the windshield and results in streaking or a complete blockage of the driver's view. This problem is enhanced when ice, snow and slush build up between the wiper blades and the windshield during operation of the wipers. In addition, when the temperature is particularly cold, the blades lose their flexibility and may not conform to the curvature of the windshield. These problems can render the wipers completely ineffective.

To overcome the above problems, the automotive industry attempted to develop a reliable and affordable device for heating the wiper blades. Several devices were developed that utilize an electrical resistor to heat the wiper blade. Examples of such devices are U.S. Pat. Nos. 4,603,451 (VanSickle); 4,387,290 (Yasuda) and 3,489,884 (Waseleski), the disclosures of which are incorporated in their entirety by reference herein.

Each of the above devices includes a means for controlling the flow of electricity to the heating element. VanSickle uses a thermostat 52 and a bimetallic thermocouple 54 to cut off electric flow when heating element 40 reaches a predetermined temperature. Yasuda uses a temperature sensor 26 positioned so that it is not affected by heating element 40. When the ambient temperature rises beyond a predetermined value, the resistance of the sensor 26 increases to disable a relay coil 30 and cut off electrical flow to the heating element 40. Unfortunately, these electrical components add to the price of the heated wiper and reduce its reliability as the failure of any component will render the device inoperative and may damage the blade.

Waseleski utilizes a bar shaped heating element 3 made of a material having a positive temperature coefficient (PTC) of resistivity to heat the blade. Electricity flows from electrical contact 7, through the length of the bar 3, and out electrical contact 9. Although this heated wiper is not believed to be commercially available, its design is believed to be deficient in several ways. Should only a portion of the blade be covered with ice, a hot spot may develop in the bar 3 which will prematurely curtail electric flow and heat production. The thickness of the bar 3 also suggests that it will not easily bend to conform to the shape of the windshield, and a crack or discontinuity in the PTC material will curtail current flow and the production of heat over the entire length of the blade. Moreover, the relatively large amount of expensive PTC material renders the price of the heated blade unaffordable.

The present invention is provided to solve these and other problems.

SUMMARY OF THE INVENTION

The present invention is a heated wiper blade comprising an elongated blade and a heating element connected to the electrical system of a vehicle. The heating element utilizes a material with a positive temperature coefficient of resistance placed between a first and second conductive members. The conductive members span the length of the heating element and provide a consistent distribution of heat through the length of the heating element. Electrical connections to the heating element are preferably located at one end of the blade. The heating element can be located inside the blade or between a semi-rigid attachment member and an upper surface of the blade.

A primary advantage of the present invention is that it provides an economical and reliable heated wiper blade for melting snow and ice. A dramatic reduction in the cost of the blade is achieved because only a relatively small amount of PTC material is required. The heated blade is more reliable because a constant electric potential is maintained through the length of the heating element. The presence of ice on only a portion of the blade will not inadvertently curtail electric flow and heat generation. In addition, lateral cracks in the PTC material and lengthwise discontinuities in the concentration of PTC material will not cut off or inadvertently curtail the flow of electricity. The invention helps prevent streaking and smearing that can impair the safe operation of the vehicle, and is especially effective in preventing snow and ice from building up under the blade.

Another advantage of the present invention is that the heating element is flexible enough to allow the blade to smoothly conform to a curved windshield during operation. This is particularly useful on cold days when a conventional blade is prone to losing its desired flexibility.

A still further advantage of the present invention is that it is interchangeable with most commercially available wiper blades. The entire windshield wiper need not be replaced, and the heated blade can be readily connected to the electrical system of most vehicles. Additionally, a windshield wiper frame specifically designed to support the heated wiper blade, could support a conventional wiper blade as well.

Other features and advantages of the invention will be apparent from the following specification taken in conjunction with the following drawings.

BRIEF DESCRIPTION OF DRAWINGS

FIG. 1 is a front view showing the heated wiper blade secured to a support frame.

FIG. 2 is a sectional view of FIG. 1 taken along line 2—2 showing a wire-type heating element located inside the wiper blade.

FIG. 3 is a sectional view of another embodiment showing a plate-type heating element located between an attachment member and an upper surface of the blade.

FIG. 4 is a perspective view of the wire-type heating element.

FIG. 5 is a perspective view of one plate-type heating element.

DETAILED DESCRIPTION

While this invention is susceptible of embodiments in many different forms, there is shown in the drawings and will herein be described in detail, preferred embodiments of the invention with the understanding that the present disclosure is to be considered as an exemplification of the principles of the invention and is not intended to limit the broad aspects of the invention to the embodiments illustrated and described.

The present invention generally relates to a heated wiper blade 20 for attaching to a support frame 10 of a typical windshield wiper 1, as shown in FIG. 1. The heated wiper blade 20 includes an elongated blade 30, a heating element 70 and means for supplying electricity to the heating element. Although the heated wiper blade 20 is particularly suited for automobiles, it should be understood that the invention is applicable to most any vehicle, such as trucks, construction equipment, trains, sea vessels and aircraft.

FIGS. 2 and 3 show two cross sectional views of the preferred embodiments of the invention. The blade 30 is preferably shaped like a commercially available wiper blade for the purpose of interchageability. Blade 30 generally comprises a thin lower portion 36 for smoothly engaging and wiping the vehicle's windshield, and a bulkier upper portion 38 for securing a semi-rigid attachment member 50 or 60. Blade 30 has a predetermined length roughly equal to that of the support frame 10. Blade 30 may be any commercially available nonconductive elastic blade having the necessary flexibility for proper operating performance on a vehicle windshield such as those made of natural rubber or Noryl™.

In the first embodiment of the invention (FIG. 2), heating element 70 is positioned inside blade 30. A hole 40 is formed into blade 30 for snugly receiving heating element 70. Attachment member 50 can be a standard commercially available attachment member. Inner edges of attachment member 50 fit snugly into a pair of grooves formed in blade 30. Outer edges of attachment 80 engage frame 10 by sliding into tracks 12.

In the second embodiment of the invention (FIG. 3), attachment member 60 is shaped to fit over an upper surface 42 of blade 30. Attachment member 60 has a middle portion 62 and two downwardly projecting portions 64. Each downwardly projecting portion 64 has an inwardly projecting flange 66 for snugly engaging the blade grooves, and an outwardly projecting flange 68 for engaging support frame 10 by sliding into track 12. Heating element 70 is snugly captured between the middle 62 of attachment member 60 and the upper surface 42 of blade 30. Attachment member 60 may be made of any semi-rigid, nonconducting material such as a hard plastic.

As shown in FIGS. 4 and 5, heating element 70 includes two spaced apart electrically conductive members 72 and 74 that span the approximate length of the blade 30. A material 75 possessing a positive temperature coefficient of resistance (PTC) is secured to and between conductive members 72 and 74 so that electricity will flow between them. Conductive members 72 and 74 span substantially the length of blade 30, and are spaced apart so that a constant electrical potential is supplied across PTC material 75 through the length of heating element 70. Although not necessary for the operation of heating element 70, conductive members 72 and 74 are preferably spaced a uniform distance apart through the length of blade 30. At cold temperatures, the PTC is a good conductor and power will readily flow through both narrow and wide sections. The narrow section will heat up more quickly but the thick section will continue to conduct electricity until it heats up.

Conductive members 72 and 74 may be a pair of standard electrical wires (FIG. 4) or a pair of conductive plates (FIG. 5), however, it should be understood that other shapes are equally possible. Both the wire and plate designs require a relatively small amount of PTC material 75. This reduction in PTC material dramatically reduces the cost of the heated wiper blade 20 and increases its flexibility. When conductive members 72 and 74 are wires, PTC material 75 can be applied around and between the wires prior to inserting, molding or coextruding them into the hole 40 formed in wiper blade 30. A plate shaped heating element 70 having a thickness of approximately 0.04 inch is available through Thermacon, Inc., of 124 Westpark Road, Dayton, Ohio 45459. The exterior of heating element 70 may be painted to inhibit corrosion during use.

PTC material 75 enables the temperature of heating element 70 to be self-regulating. As the temperature of PTC material 75 increases past its Curie Point or Curie Temperature, electrical resistance increases substantially and current flow is impeded. This results in a stable top end temperature near the Curie Point of the PTC material 75. To prevent the deterioration of wiper blade 30, the Curie Point should be below 170° Fahrenheit, about 100°–140° Fahrenheit being preferred. Elastomeric materials exhibiting desirable PTC characteristics are preferred, however, it should be understood that any material possessing desirable PTC characteristics would be acceptable.

As shown in FIG. 1, heating element 70 may include electrical connectors 80 and 82 for connecting conductive members 72 and 74 to wires 90 and 92 respectively. Connectors 80 and 82 preferably project out of one end 32 of blade 30 to facilitate installation, and may be formed by continuing conductive members 72 and 74 past the end 32 of blade 30 or by simply attaching additional pieces of wire to conductive members 72 and 74. A commercially available electrical coupling 100 may also be mounted on support frame 10 near the end 32 of blade 30 to permit removal and replacement of just the heated blade 20. Another coupling (not shown) may be provided at the top 14 of support frame 10 to facilitate removal and replacement of the entire windshield wiper 1.

Electricity is supplied to the heating element 70 through positive and negative wires 90 and 92. These wires 90 and 92 connect conductive members 72 and 74 to the electrical system of the vehicle. Wire 90 may be connected to the vehicle's battery or alternator (not shown), and wire 92 may be connected to a common ground for the vehicle. For example, wire 90 may be connected to the rear window defroster to enable a driver to use a defrost switch (not shown) to activate and deactivate the heated wiper blade 20.

It will be understood that the invention may be embodied in other specific forms without departing from the spirit or central characteristics thereof. The present examples and embodiments, are to be considered in all respects as illustrative and not restrictive, and the invention is not to be limited to the details shown and described herein.

I claim:

1. A wiper blade assembly capable of being heated and operating at a substantially constant temperature, said blade assembly comprising:

an elongated wiper blade consisting of a one-piece structure and an attachment member connected thereto; and an elongated heating element in physical contact with said blade and said attachment member, and extending substantially parallel to said blade along the length of said blade, said heating element consisting of (a) a pair of spaced apart, elongated conductive members extending parallel to and substantially the length of said blade and (b) a material with a positive temperature coefficient of resistance disposed between and in electrical contact with said conductive members along the length of said blade;

wherein said attachment member is positioned over an upper surface of said blade and captures said heating element between itself and said blade.

2. The wiper blade assembly of claim 1, which also includes means for supplying electricity to said conductive members.

3. The wiper blade assembly of claim 1, wherein the heating element is flexible.

4. A wiper blade assembly comprising:

an elongated blade consisting of a one-piece structure having a predetermined length with first and second ends and an attachment member for engaging said blade to a support frame; and an elongated, plate shaped heating element positioned substantially parallel to said blade, the heating element consisting of (a) first and second spaced apart, elongated, flat conductive members extending parallel to and substantially the length of said blade and (b) a material with a positive temperature coefficient of resistance disposed between and in electrical contact with said conductive members thereby providing substantially constant distribution of heat directly to the blade along the length of said blade when heating said wiper blade;

wherein said attachment member is positioned over an upper surface of said blade and maintains said heating element between itself and said blade.

5. The wiper blade assembly of claim 4, which also includes first and second connectors, said first connector being in electrical communication with said first conductive member and said second connector being in electrical communication with said second conductive member, said connectors projecting beyond an end of said blade.

6. The wiper blade assembly of claim 5, which also includes means for supplying electricity to said electric connectors at an end of said blade.

7. A heated wiper blade comprising:

an elongated blade consisting of a one-piece structure having a predetermined length having means for retaining said blade in a desired position;

an elongated, plate shaped heating element contacting said blade along the length of said blade, said heating element consisting of (a) a pair of spaced apart, elongated, flat conductive members extending parallel to and substantially the length of said blade and (b) a material with a positive temperature coefficient of resistance between and in electrical contact with said conductive members; and means for supplying electricity to said conductive members;

wherein said heating element is maintained in contact with the upper surface of said blade by said means for retaining said heating element between itself and said blade.

* * * * *